US012500014B2

(12) United States Patent
Gong et al.

(10) Patent No.: US 12,500,014 B2
(45) Date of Patent: Dec. 16, 2025

(54) RING VARISTOR FOR USE IN DC MICROMOTOR

(71) Applicant: GUANGZHOU NEWLIFE NEW MATERIAL CO., LTD., Guangdong (CN)

(72) Inventors: Kai Gong, Guangdong (CN); Jianping Sun, Guangdong (CN); Xiaojing He, Guangdong (CN); Xuezhao Wang, Guangdong (CN); Xiaoming Wang, Guangdong (CN)

(73) Assignee: GUANGZHOU NEWLIFE NEW MATERIAL CO., LTD., Guangzhou (CN)

( * ) Notice: Subject to any disclaimer, the term of this patent is extended or adjusted under 35 U.S.C. 154(b) by 399 days.

(21) Appl. No.: 18/220,820

(22) Filed: Jul. 11, 2023

(65) Prior Publication Data

US 2024/0013956 A1 Jan. 11, 2024

(30) Foreign Application Priority Data

Jul. 11, 2022 (CN) ......................... 202210805568.5

(51) Int. Cl.
*H01C 7/115* (2006.01)
*H01C 1/142* (2006.01)
(Continued)

(52) U.S. Cl.
CPC ............. *H01C 7/115* (2013.01); *H01C 1/142* (2013.01); *H01C 7/1013* (2013.01); *H01C 17/288* (2013.01)

(58) Field of Classification Search
CPC ..... H01C 7/115; H01C 7/1013; H01C 17/288
See application file for complete search history.

(56) References Cited

U.S. PATENT DOCUMENTS

2002/0121834 A1* 9/2002 Furuya ................. H02K 13/105 310/234
2024/0013956 A1* 1/2024 Gong ....................... H01C 7/10

FOREIGN PATENT DOCUMENTS

CN 101101811 * 1/2008
CN 118136355 * 6/2024 ............... H01C 7/10
(Continued)

OTHER PUBLICATIONS

JP-H05315108 translation (Year: 1993).*
(Continued)

*Primary Examiner* — Kyung S Lee

(57) ABSTRACT

The present invention provides a ring varistor for use in DC micromotor including a ring varistor substrate having non-linear volt-ampere characteristics and at least three independent electrodes evenly sintered on an end face of the ring varistor substrate. The electrode gap between two adjacent electrodes consists of two straight parallel edges of the two adjacent electrodes, and an inner and an outer concentric arc on the substrate ring, the electrode gap is not orthogonal to the ring. Due to the asymmetry arrangement of the surface electrodes and the electrode gaps, the electrode materials and the substrate materials with different thermal conductivity have no contact cross distribution with each other at the radial electrode gap. During welding, the heat shock is transmitted asymmetrically through the asymmetric electrodes, to improve the uniformity of the heat conduction distribution of the varistor and reduce the defective rate of the substrate welding fracture.

14 Claims, 3 Drawing Sheets

(51) Int. Cl.
*H01C 7/10* (2006.01)
*H01C 17/28* (2006.01)

(56) References Cited

FOREIGN PATENT DOCUMENTS

| | | | |
|---|---|---|---|
| JP | H05315108 | * | 11/1993 |
| JP | 4053803 | * | 2/2008 |

OTHER PUBLICATIONS

CN-101101811 translation (Year: 2008).*
JP-4053803 translation (Year: 2008).*
CN-118136355 translation (Year: 2024).*
Google Search print out (Year: 2025).*

* cited by examiner

RING VARISTOR FOR USE IN DC MICROMOTOR

CROSS-REFERENCE TO RELATED APPLICATION

The present application claims priority to Chinese patent application number CN 202210805568.5 filed Jul. 11, 2022, the entire contents of which are hereby incorporated by reference.

FIELD OF THE INVENTION

The present invention generally belongs to the field of semiconductor electronic ceramics and, more particularly, relates to a ring varistor for use in DC micromotor for improving welding fracture.

BACKGROUND OF THE INVENTION

Ring varistor is a semiconductor ceramic electronic component having dual functions of voltage sensitivity and capacitive characteristic. Ring varistors have been widely used in micro DC brush motor to eliminate spark and inhibit noise. The voltage sensitivity characteristic can be used to absorb transient spark generated on the commutator to protect the motor brush and the winding. The capacitive characteristic can be used to inhibit electromagnetic interference, prolong the working life of the micromotor, and improve the working quality of the micromotor.

With the rapid development of electronic technology and the improvement of welding efficiency, it is required to complete the welding of the ring varistor in a shorter time and at a higher temperature, even to withstand laser welding. Whether the problem of ring varistors substrate rupture caused by welding is solved or not directly determines whether the ring varistors can be installed and used or not.

CN102856027B discloses a preparation method of a ring varistor. In the preparation method of the ring varistor, the glass slurry is screen printed on the ring resistor body without an electrode. During sintering, the glass slurry melts, wets the ring resistor body and penetrates into the ring resistor body, to form a canine-like mating state, thereby forming a mechanical interlocking connection, which can significantly improve the mechanical strength (bending strength) of the ring varistor. It can be clearly seen that the preparation method disclosed in CN102856027B not only can prevent the rupture of ring varistors during production, packaging, transportation and installation, but also can improve the rupture of substrate caused by welding directly.

Chinese patent application number CN2022103530678 discloses a bottom ohmic silver paste for strontium titanate ring varistor, preparation method and use thereof. Via improving the formula of bottom ohmic silver paste of the electrode, the electrode portion can withstand stricter welding conditions, such as higher welding temperature and laser welding. The technical solution of CN2022103530678 indirectly contributes to the improvement of substrate rupture caused by welding thermal shock.

The present invention provides another technical solution to improve the welding fracture of ring varistor for use in DC micromotor.

Additional definitions and descriptions of terms used in the technical solution: welding refers to the welding of the wire on the armature winding of the DC motor on the surface electrode of the ring varistor during the installation of the ring varistor.

The straight line passing through the center of the circle is a virtual auxiliary line to assist in describing the planar geometry of an electrode-free substrate gaps between any two adjacent electrodes. The center of the circle, the straight line passing through the center of the circle, the concentric arc, the parallelism, the axis symmetry are all on the same plane of the ring varistor. The above definitions and normal distributions are not absolute mathematical definitions, but acceptable tolerances in industrial production. Orthogonality refers to the line segment formed by intersecting a line between and equidistant from two adjacent edge of electrode gap parallel to each other with the inner and outer circular arcs of the substrate ring, or, when the electrode gap is regarded as the line segment intersecting the inner and outer arcs, the line segment is the shortest distance between the two arcs of the substrate ring under the orthogonal condition, the electrode gap shown in FIG. 3 is the orthogonal condition. The cross angle means that the middle straight line equidistant from the parallel straight lines of two adjacent edges of electrodes gap is not orthogonal to the inner and outer circular arcs of the substrate ring at the same time. In other words, the line segment between the inner and outer circular arcs is not the shortest, and the electrode gaps shown in FIGS. 1 and 2 are non-orthogonal.

The welding fracture refers to the dark crack, crack and collapse on the substrate of the ring varistor caused by the heat shock of the electrode when the ring varistor is welded.

The ratio of the radial area is indirectly reflected by the ratio of the length of any straight line passing through the center of the circle uncovered by electrode on the ring to the length between the two arcs in the electrode gap.

The nonlinear volt-ampere characteristics can be approximately expressed by the formula as following:

$$I=(U/C)^{\alpha}$$

wherein, I is the current flowing between the adjacent electrodes of the ring varistor, U is the voltage between two ends of the adjacent electrodes of the ring varistor, C is the material constant, and α is a nonlinear coefficient greater than 1, in which a can be represented by the following formula:

$$\alpha=1/\lg(E10/E1)$$

in which, E1 and E10 are the voltages between the two adjacent electrodes of the ring varistor when the current flowing through the strontium titanate ring varistor is 1 mA and 10 mA.

End electrode is also called planar electrode.

SUMMARY OF THE INVENTION

One embodiment of the present invention provides a ring varistor for use in a DC micromotor for improving welding fracture, including a ring varistor substrate with nonlinear volt-ampere characteristics and at least three electrodes sintered on an end surface of the substrate with equidistant distribution, wherein an electrode gap between any two adjacent electrodes are non-electrode-covered substrates enclosed by straight edges of the electrodes parallel to each other and inner and outer concentric arcs of the substrate ring, the plane shape of the electrode gap between any two adjacent electrodes does not take any straight line passing through the circular center of a ring varistor in the gap plane as a symmetrical axis.

Similarly, the at least three electrodes do not take the straight line passing through the center of the circle as symmetrical axes and are asymmetrical structures on the ring.

Preferrably, the plane shape of the electrode gap between any two adjacent electrodes is not non-orthogonal to the ring, and at least one straight line passing through the center of the circle can intersect with at least a part of one electrode.

Preferrably, the cross angles to the substrate ring of the gap shape of the substrate between any two adjacent electrodes are consistent with each other, and distributed equally apart from each other.

Preferrably, the length of the outer arc between any two adjacent electrode gaps is 1.2±0.8 mm.

Preferrably, the electrode is one of the single-plane electrode sintered on the single-plane end face of the substrate, or one of the double-plane electrode sintered on the upper and lower end faces of the substrate.

Preferrably, the electrode is one of the planar 3 poles, the planar 5 poles, the planar 6 poles and the planar 12 poles.

Preferrably, the ring varistor substrate with nonlinear volt-ampere characteristics is one of strontium titanate ring varistor substrate and zinc oxide ring varistor substrate.

Preferrably, the electrode is one of silver electrode, copper electrode and copper alloy electrode.

Preferrably, the size specification of the ring varistor substrate has a series of specifications from 2.5 mm to 23.0 mm in outer diameter matched with the installation of the DC micromotor.

Preferrably, the size specification of the ring varistor substrate has a series of specifications from 9.5 mm to 230 mm in outer diameter matched with the installation of the DC micromotor.

Preferrably, the ring varistor has a series of specifications with a varistor voltage E10 value of 1.5-100V.

Preferrably, the nonlinear coefficient α of the ring varistor is 2.0-7.0.

Preferrably, the preparation method of the ring varistor includes the steps of: solid phase synthetizing SrTiO3 or SrTiO3 composite system main material; adding semiconductor agent, deionized water, additives, binder to obtain a slurry after ball milling; obtaining embryo after spray granulation and dry pressing; preparing a semi-conductive substrate after discharging glue and reduction sintering; forming a strontium titanate ring varistor substrate with non-linear volt-ampere characteristics by oxidation heat treatment in the air; printing a bottom layer and a surface layer of an electrode with an asymmetric shape and sintering to obtain a strontium titanate ring varistor.

Preferrably, each component of the slurry is uniformly mixed and has a normal distribution with a median particle size of 1-4 μm.

Preferrably, the semiconducting agent is a hypervalent ion with an ionic radius close to $Sr^{2+}$, such as $La^{3+}$ replaces $Sr^{2+}$, or a pentavalent ion with an ionic radius close to $Ti^{4+}$, such as $Nb^{5+}$ replaces $Ti^{4+}$.

$$SrTiO_3+xLa^{3+}\rightarrow Sr2+1-xLa3+_xTi4+1-_x(Ti^{4+}\cdot e)_xO2-3+xSr^{2+}$$

$$SrTiO_3+xNb^{5+}\rightarrow Sr^{2+}Ti4+1-x(Ti^{4+}\cdot e)_xNb5+xO2-3+xTi^{4+}$$

As a result of the above doping, to ensure the overall electrical neutrality, under the condition of high temperature reduction atmosphere, the $Ti^{4+}$ with variable valence is easy to form a weak bond and become a conductive carrier $Ti^{4+}\cdot e$. The n-type semiconductor substrate was prepared by firing the embryo. At the same time, the heat conduction function of the semiconductor substrate is increased.

Preferrably, the addition also includes the low-valent acceptor doping of $Mn^{2+}$, $Na^{+1}$ ion. Due to the different oxidation heat treatment in the air, a high-resistance layer is re-fabricated on the fired n-type semiconductor substrate shell, to generate a series of specifications of the sensitive devices with different voltage-sensitive thresholds. Due to the interaction of oxidation and doping of acceptor, the conductive carriers are trapped, and the electric conductivity and the thermal conductivity of the semiconductor shell are greatly reduced.

Preferrably, due to the printing of the electrode bottom layer and the surface layer of the asymmetrical shape, ohmic contact is formed, and the surface layer electrode satisfies conductivity and solderability.

According to another embodiment of the present invention, a DC micromotor is provided. The DC micromotor includes a stator and a rotor, wherein the DC micromotor is provided with a ring varistor of the present invention to improve the welding fracture of the DC micromotor.

A plane shape of the electrode gap between any two adjacent electrodes does not take any straight line passing through the circular center of a ring varistor in the gap plane as symmetrical axis, which is an asymmetry structure on the circular ring different from the prior art that the symmetry structure of both of the plane electrode and the electrode gap orthogonal to the circular ring. The nonlinear volt-ampere characteristics of the ring varistor do not change, while the welding fracture rate is decreased and the capacitance is increased.

The plane shape of the electrode gap in the technical solution of the embodiment of the present invention does not take any straight line in the electrode gap passing through the circular center of the ring varistor as the symmetrical axis. Compared with the comparative embodiments 1-6 in the prior art which take a straight line in the electrode gap passing through the circular center of the ring varistor as the symmetrical axis, the proportion of the radial area of the bare substrate in the electrode gap is reduced, so that the different electrode materials and the semiconductor ceramic substrate materials have no contact distribution with each other at the radial electrode gap. During welding, the sudden heat generated can be better diffused asymmetrically through the asymmetric shape of the electrode. Different from the comparative embodiments in which electrode-free substrate area in the electrode gap has a short distance between the two arcs, the present invention can improve the thermal conductivity distribution uniformity of the overall varistor material, effectively improve the ability of heat shock resistance, and increase the capacitance of the varistor.

The slurry with the median particle size of 1-4 μm normal distribution in preparation process contributes to the uniform and complete semiconducting of the substrate in the sintering process as a whole, and the semiconductor substrate prepared has higher density and better electrical conductivity, thereby reducing the defects caused by local uneven density of the substrate, which enables the substrate to withstand thermal and mechanical shocks.

The technical solution of the present invention has strong operability and is easy for mass production.

BRIEF DESCRIPTION OF THE DRAWINGS

In order to better illustrate the technical solution of the present invention, the present invention will be described in detail in view of the examples and the attached drawings. All the specific parameters and descriptions of the examples of the present invention are used for better illustration only, not for limitation of the present invention. Any replacement, recombination, deletion or addition that does not exceed the expected effect of the technical solution will fall within the scope of protection of the present invention.

In FIGS. 1, 2 and 3, 1 is a ring varistor substrate for DC micromotor, the shadow part 2 is the electrode, and 3 is the electrode gap between any two adjacent electrodes. The electrode gap 3 is the substrate having no electrode covered, which is enclosed by two straight parallel edges of the two electrodes and an inner and an outer concentric arc on the substrate ring, D1 is the outer diameter of the ring varistor, D2 is the inner diameter of the ring varistor, T is the thickness of the ring varistor.

In FIG. 1, the shape of the substrate of electrode gap 3 of any two adjacent electrodes is not orthogonal to the ring, and the electrode gap 3 does not take OA, OB, OC in the plane as the symmetric axis; W is the width of the bare substrate of the electrode gaps between any two adjacent electrodes, the outer arc length of the three electrode gaps 3 is equal to 0.7 mm, and the electrodes have asymmetrical structure, at least one straight line passing through the center of the circle in the electrode gap intersects a portion of one electrode.

In FIG. 2, the shape of the bare substrate of electrode gap 3 of any two adjacent electrodes is not orthogonal to the ring, and the electrode gap 3 does not take OA, OB, OC in the plane as the symmetric axis; the outer arc length of the three electrode gap 3 is 0.5 mm. The electrode has an asymmetrical structure. At least one straight line passing through the center of the circle in the electrode gap 3 intersects parts of the two electrodes at the same time. OA, OB, OC in FIG. 2 intersect parts of the two adjacent electrodes at the same time.

In FIG. 3, the shape of the bare substrate of electrode gap 3 of any two adjacent electrodes is orthogonal to the ring, take OA, OB, OC in the plane as the symmetric axis, the outer arc length is 1.2 mm, and the electrode has symmetrical structure.

DETAILED DESCRIPTION OF THE INVENTION

Figure 1:
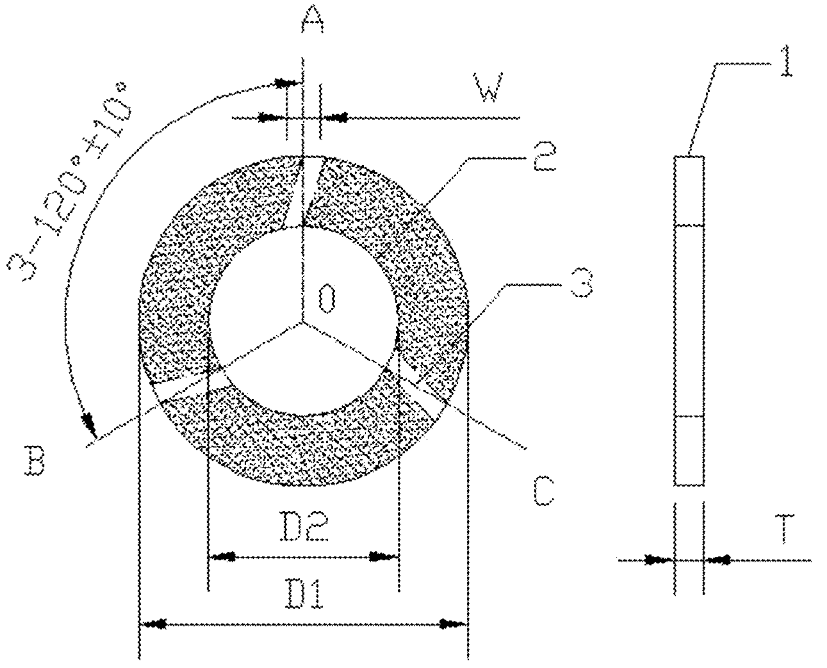
FIG. 1 is a schematic diagram of a technical solution according to one embodiment of the present invention, showing a top view and side view of a ring varistor.
Figure 2:
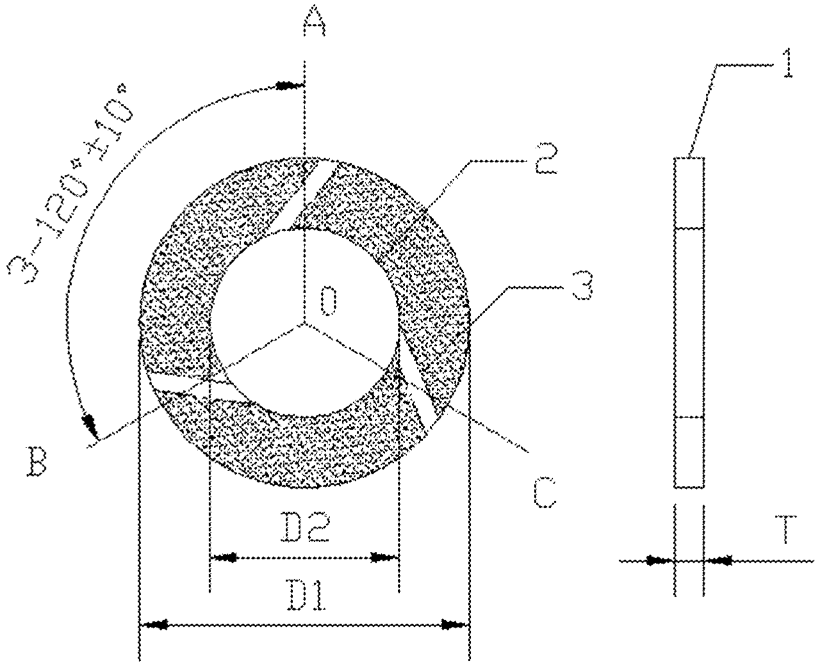
FIG. 2 is a schematic diagram of a technical solution according to another embodiment of the present invention, showing a top view and side view of a ring varistor.

Referring to FIG. 1, a ring varistor for use in DC micromotor for improving welding fracture according to embodiments 1-6 of the present invention includes a strontium titanate ring varistor substrate 1 with nonlinear voltage-ampere characteristics and silver electrodes 2 sintered on the surface of the substrate, wherein the electrode has three electrodes in a single plane. The electrode gap 3 without electrode formed thereon is enclosed by an inner and outer concentric arc of the substrate 1 and two straight parallel edges of the two adjacent electrodes, any electrode gap 3 is not orthogonal to the ring, the shape of the electrode gap 3 does not take any straight line in the electrode gap passing through the center of the ring varistor as symmetrical axis. The shape of the three electrode gaps 3 is consistent with the cross angle to the ring in the plane, and is distributed equally on the ring. The outer arc length of the electrode gap is 0.7 mm, and the electrode itself has an asymmetric shape.

Referring to FIG. 1, a ring varistor for use in DC micromotor according to comparative embodiments 1-6 of the prior art is shown. The comparative embodiments 1-6 of the prior art differs from the embodiments 1-6 of the present invention in that: the electrode gaps 3 are orthogonal to the ring, and the three electrode gaps take OA, OB and OC as the symmetrical axes. The outer arc length of the three electrode gaps 3 is 1.2 mm, and the electrodes themselves are symmetrical on the rings.

The ring varistors according to comparative embodiments 1-6/embodiments 1-6 of the present invention are prepared by the following process:

Step 1, solid phase synthesizing $SrTiO_3$ composite material;

$$(1\text{-}x\text{-}y)\ SrCO_3 + x\ BaCO_3 + y CaCO_3 + TiO_2 \xrightarrow{1250 \pm 30^\circ \text{ C. for 2 h}} (Sr_{1\text{-}x\text{-}y}BaxCay)\ TiO_3 + CO_2$$

Step 2, successively adding semi-conductive agent, deionized water, additive and binder to obtain a slurry via ball milling, each component of the slurry being mixed uniformly and having a median particle size of 1-4 μm normal distribution; and obtaining an embryo after spray granulation and dry pressing, in which, (0.05-0.0.1)$La_2O_3$, (0.1-0.3)$Nb_2O_5$, (0.2-0.4)$ZrO_2$, (0.1-1.5%)($SiO_2$+$MnCO_3$+$Al(NO_3)_3 \cdot 9H_2O$+$Na_2CO_3$) and appropriate amount of PVA are added successively;

Step 3, preparing semi-conductive substrate by removing glue and reducing sintering, and the sintering atmosphere is $N_2$ and $N_2$ mixed gas, and the sintering process is carried out at 1320-1370° C.

Figure 3:
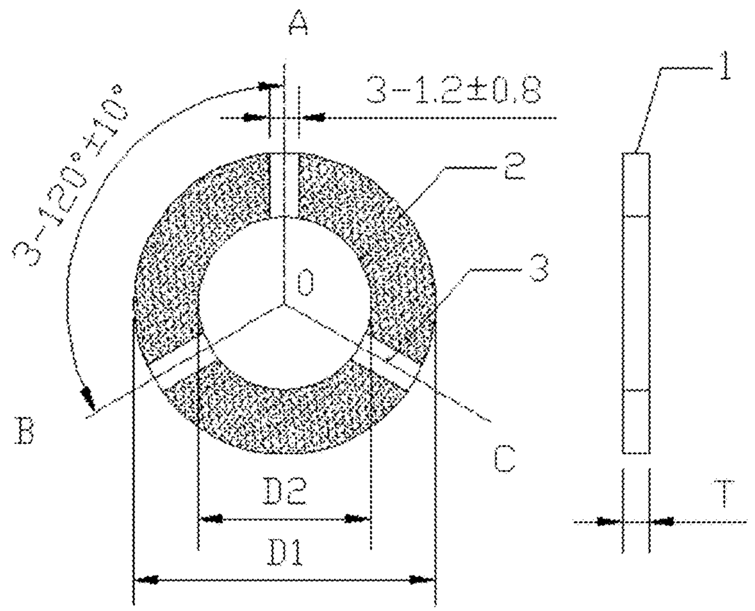
Fig. 3 (Prior Art)
FIG. 3 is a schematic diagram of a technical solution according to prior art, showing a top view and side view of a ring varistor.

Step 4, carrying out oxidizing heat treatment in air to form a strontium titanate ring varistor substrate with non-linear volt-ampere characteristics; obtaining the voltage-sensitive voltage with different threshold values for DC micromotor via adjusting the heat treatment temperature and time;

Step 5, printing the bottom layer and the surface layer of the electrode with asymmetric shape as shown in FIG. 1, sintering, and preparing the strontium titanate ring varistor of embodiment 1-6 of the present invention. The bottom layer and surface layer of electrode with symmetrical structure as shown in FIG. 3 are printed and sintered to obtain a strontium titanate varistor of comparative embodiments 1-6;

The above steps include unspecified technical details well known in the art, which will not be detailed further in the present invention.

Selecting 100 pieces from 100,000 pieces in embodiments 1-6 and comparative embodiments 1-6 and welding, after size inspection and appearance selection, recording the defective rate of substrate welding fracture in Table 1 and the specific dimensions of the varistors in Table 2.

TABLE 1

| Welding defects record | | | | | | | |
|---|---|---|---|---|---|---|---|
| | | | | | | Defect rate after welding (%) | |
| Serial number of embodiments and comparative embodiments | Outer diameter of the varistor | Lot number of the varistor | Powder | Sintering furnace | Welding temperature | Embodiments having asymmetrical structure | Comparative Embodiments having symmetrical structure |
| 1 | 120D | SG253020b0 | G127 | 328#/5# | 400° C. | 8 | 14 |
| 2 | 120D | SG221335b0 | G417 | 157#/2# | 400° C. | 4 | 18 |
| 3 | 107A | SS240840y0 | 082powder | 248#/2# | 400° C. | 1 | 2 |
| 4 | 107A | SG260549b0 | 144 powder | 328#/3# | 400° C. | 0 | 3 |
| 5 | 107A | SG260749y0 | 167 powder | 248#/2# | 400° C. | 3 | 9 |
| 6 | 107A | SC262240b0 | 144 powder | 328#/3# | 400° C. | 0 | 0 |

Notes:
The powder is granular material with different formula.

Lot number of the varistor is used to record different formulation of the granular materials, molding date, and shift.

TABLE 2

| Sizes of the ring varistors according to embodiments and comparative embodiments | | | |
|---|---|---|---|
| Abbreviation | Outer diameter D1 (mm) | Inner diameter D2(mm) | Thickness T(mm) |
| 120D | 12.00 ± 0.30 | 6.95 ± 0.30 | ≤1.10 |
| 107A | 10.70 ± 0.20 | 6.70 ± 0.20 | ≤1.05 |

Analysis 1

Lot number of the varistor, powder, sintering furnace, size of the varistor, welding temperature are kept consistent, the welding defect rate of the varistors having asymmetrical structures of embodiments 1-6 is obviously lower than those of the varistors having symmetrical structures in the prior art, and the decreasing trend does not change with the change of lot number of the varistor, powder and sintering furnace.

Referring to embodiment 6 and comparative embodiment 6, under proper conditions of lot number of the varistor, powder, outer diameter of the varistor, welding temperature and sintering furnace, the prior art and the technical solution of the present invention have desirable welding effect. However, when the ring varistor has an outer diameter no less than 12 mm or when the formula is fine-tuned, compared with comparative embodiments 1 to 5, embodiments 1-5 show a significant improvement in welding defects relative to comparative embodiments 1-5.

Electrical performance tests were performed on 20 chips in embodiments 5, 6 and 20 chips in comparative embodiments 5, 6, and the results were recorded in Table 3.

TABLE 3

| Results of electrical performance | | | | | | |
|---|---|---|---|---|---|---|
| | | E1 (V) | E10 (V) | a | Electric capacity (nF) | Bending strength (N) |
| Embodiment 5 | MAX | 8.26 | 13.51 | 4.75 | 56.80 | 60.30 |
| lot number of varistor: | MIN | 6.74 | 11.07 | 4.48 | 44.20 | 41.10 |
| SG260749y0107A | X | 7.56 | 12.40 | 4.65 | 50.57 | 49.28 |
| Comparative embodiment 5 | MAX | 9.03 | 14.65 | 4.81 | 43.10 | 59.30 |
| lot number of varistor: | MIN | 7.62 | 12.49 | 4.64 | 35.80 | 44.30 |
| SG260749y0107A | X | 8.35 | 13.58 | 4.74 | 38.31 | 50.92 |
| Embodiment 6 | MAX | 1.49 | 2.90 | 3.61 | 276.10 | 51.90 |
| lot number of varistor: | MIN | 0.74 | 1.79 | 2.54 | 147.30 | 30.50 |
| C262240b0107A | X | 1.05 | 2.24 | 3.02 | 209.07 | 39.29 |
| Comparative ebodiment 6 lot | MAX | 1.40 | 2.78 | 3.39 | 177.10 | 56.00 |
| number of varistor: | MIN | 0.72 | 1.82 | 2.48 | 123.30 | 32.40 |
| SC262240b0107A | X | 1.04 | 2.24 | 2.96 | 149.23 | 42.05 |

Notes:
Max refers to the maximum, Min refers to the minimum, and X refers to the average.

Analysis 2

The embodiments 5 and 6 of the present invention and comparative embodiments 5 and 6 meet the requirements of the nonlinear volt-ampere characteristics of the varistor. The bending strength and a value of the varistor are slightly inferior, but can still meet the requirements of the use of the motors. However, due to the increase of the capacitance, the effect of electromagnetic interference suppression can be improved.

The embodiment 5 of the present invention was selected to record the surface electron micrograph: the surface electron micrograph of the substrate after semi-conducting and before heat treatment, the surface electron micrograph of the substrate after semi-conducting and heat treatment, the electron micrograph of the electrode surface.

Analysis 3

Figure 4:
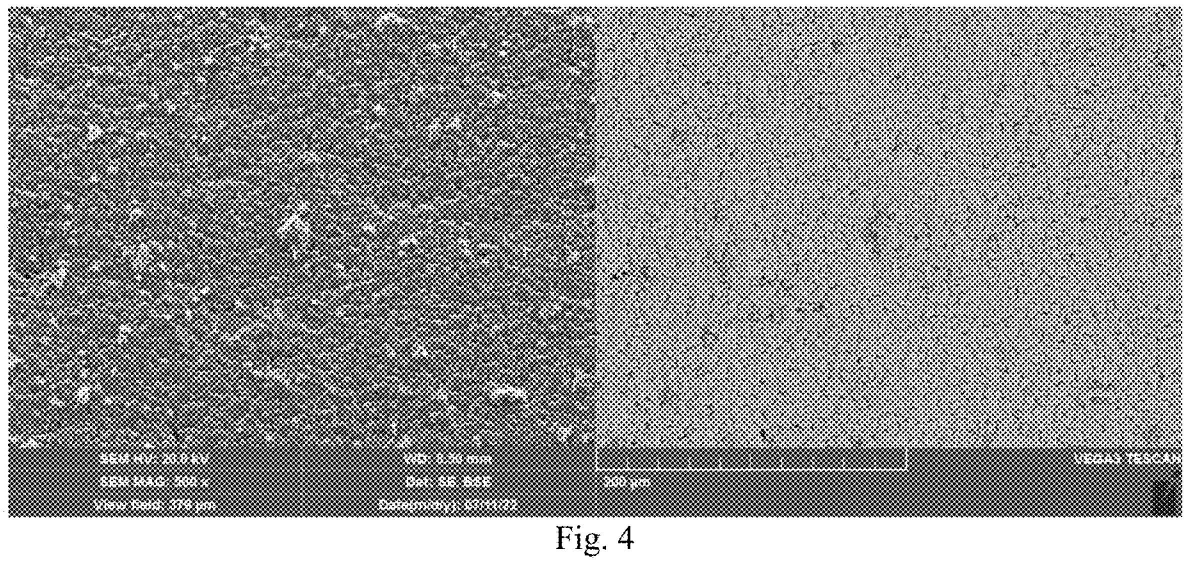
FIG. 4 is a surface electron micrograph of a substrate after semi-conducting and before heat treatment according to embodiment 5 of the present invention.
Figure 5:
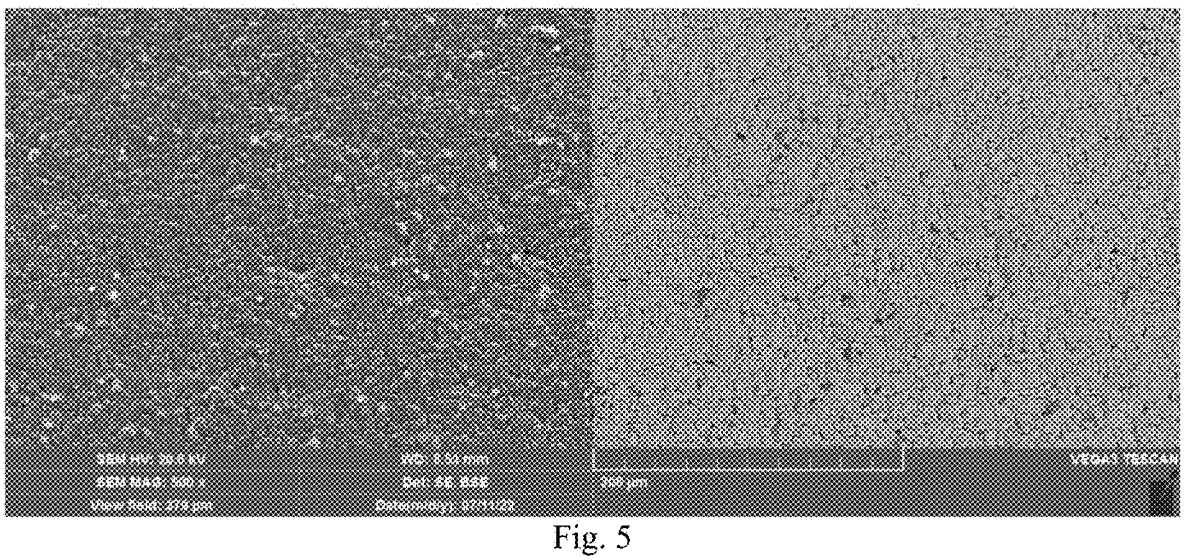
FIG. 5 is a surface electron micrograph of a substrate after semi-conducting and heat treatment according to embodiment 5 of the present invention.
Figure 6:
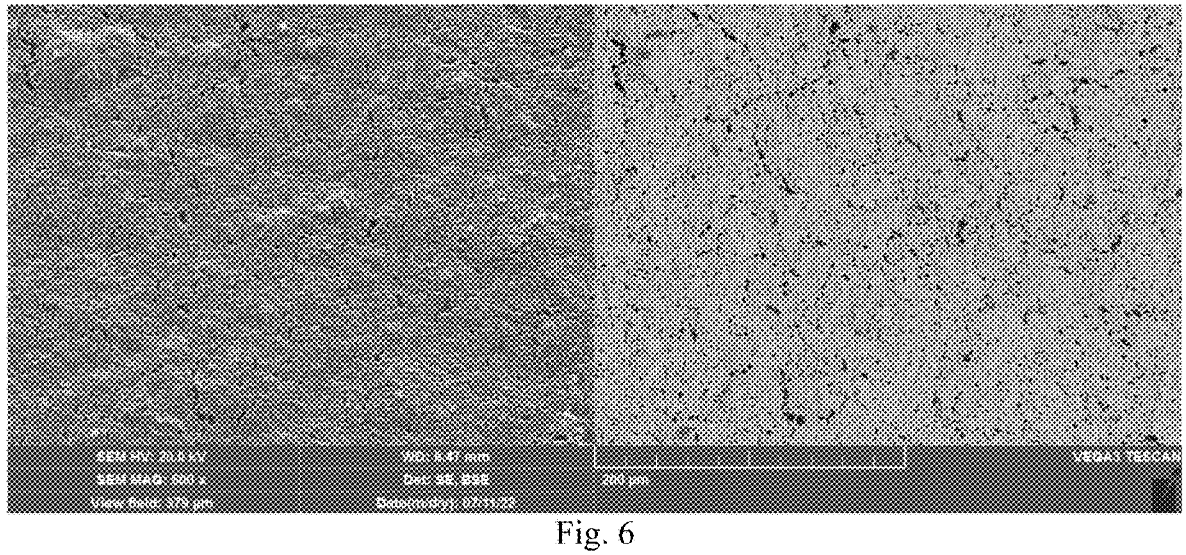
FIG. 6 is an electron micrograph of an electrode surface according to embodiment 5 of the present invention.

In the preparation process of the present invention, the components are uniformly mixed via ball milling, and the median particle size is normal distribution of 1-4 μm. From the electron micrograph shown in FIGS. 4 and 5, it can be seen that, after sintering, the grain distribution is uniform and no obvious holes are found, which can reduce the welding fracture caused by uneven heat conduction due to the holes. As can be seen in FIG. 6, the electrode surface has formed a compact conductive compound, and the thermal shock caused by welding can be conducted and diverged via the electrode faster than those of the structures in FIGS. 4 and 5. The asymmetrical structure of the electrodes can effectively improve the uniformity of the overall heat conduction of the varistor.

The above described embodiments are only preferred embodiments of the present invention, and are not intended to limit the scope of the present invention. Any modification, equivalent replacement and improvement within the spirit and principle of the present invention should be included in the protection scope of the present invention.

What is claimed is:

1. A ring varistor for use in DC micromotor for improving welding fracture, comprising a ring varistor substrate with nonlinear volt-ampere characteristics and at least three electrodes sintered on an end surface of the substrate, wherein an electrode gap between any two adjacent electrodes is an electrode-free substrate enclosed by straight line parallel edges of the two electrodes and an inner and outer concentric arc on the substrate ring, a plane shape of the electrode gap between any two adjacent electrodes does not take any straight line passing through the circular center of the ring varistor in the gap plane as symmetrical axis.

2. The ring varistor according to claim 1, wherein the planar shape of the electrode gap between any two adjacent electrodes is not orthogonal to the substrate ring, and at least one straight line passing through the center of the circle can intersect at least part of one electrode.

3. The ring varistor according to claim 1, wherein cross angles to the substrate ring of the gap shape of the substrate between any two adjacent electrodes are consistent with each other, and distributed equally apart from each other.

4. The ring varistor according to claim 1, wherein the outer arc in the electrode gap between any two adjacent electrodes has a length of 1.2±0.8 mm.

5. The ring varistor according to claim 1, wherein the electrode is a single plane electrode sintered on one end face of the substrate, or a double plane electrodes sintered on upper and lower end faces of the substrate.

6. The ring varistor according to claim 1, wherein the electrode is one of the planar 3-pole, the planar 5-pole, the planar 6-pole and the planar 12-pole.

7. The ring varistor according to claim 1, wherein the ring varistor substrate with nonlinear volt-ampere characteristics is one of strontium titanate ring varistor substrate and zinc oxide ring varistor substrate.

8. The ring varistor according to claim 1, wherein the electrode is one of silver electrode, copper electrode and copper alloy electrode.

9. The ring varistor according to claim 1, wherein a size specification of the ring varistor substrate has a series of specifications from 9.5 mm to 23.0 mm in outer diameter matched with installation of a DC micromotor.

10. The ring varistor according to claim 1, wherein the ring varistor has a series of specifications with a varistor voltage E10 value of 1.5-100V.

11. The ring varistor according to claim 1, wherein the non-linear coefficient α value of the ring varistor is 2.0-7.0.

12. The ring varistor according to claim 1, wherein a preparation method of the ring varistor comprises the steps of: solid synthesizing $SrTiO_3$ or $SrTiO_3$ composite system main material; adding semi-conductive agent, deionized water, additives and binder to obtain a slurry via ball milling; obtaining an embryo via spray granulation and dry pressing; discharging glue and reduce sintering the embryo to obtain a semi-conductive substrate; forming a strontium titanate ring varistor substrate with non-linear volt-ampere characteristics via oxidation heat treatment in air; and printing asymmetrical electrode bottom layer and surface layer, and obtaining a strontium titanate ring varistor after sintering.

13. The ring varistor according to claim 12, wherein each component of the slurry is mixed and has a median particle size of 1-4 μm normal distribution.

14. A DC micromotor, comprising a stator and a rotor, wherein the DC micromotor is provided with a ring varistor for use in DC micromotor of claim 1 to improve welding fracture.

* * * * *